E. N. CRAMER.
SILO.
APPLICATION FILED OCT. 12, 1912.

1,090,282.

Patented Mar. 17, 1914.

WITNESSES:
A. H. Edgerton.
O. M. McLaughlin.

INVENTOR.
Eli N. Cramer.
BY
V. H. Lockwood
ATTORNEY.

UNITED STATES PATENT OFFICE.

ELI N. CRAMER, OF BROOKLYN, INDIANA.

SILO.

1,090,282.  Specification of Letters Patent.  Patented Mar. 17, 1914.

Application filed October 12, 1912. Serial No. 725,409.

*To all whom it may concern:*

Be it known that I, ELI N. CRAMER, a citizen of the United States, and a resident of Brooklyn, county of Morgan, and State of Indiana, have invented a certain useful Silo; and I do hereby declare that the following is a full, clear, and exact description thereof, reference being had to the accompanying drawings.

The object of this invention is to provide means for binding silos to hold their staves in place, which can yield or contract as the silos expand or contract, and to be tightened by a man standing on the ground.

When the silos are empty in the summer time, they dry and are liable to fall down, by reason of the contraction of the staves. In order to tighten the original hoops used in silo building, it is necessary to climb up on the silo. That is dangerous, for the silo may fall in the dry condition. With my invention the silo can be tightened without climbing, and the staves will be held tightly together, when the silo is dry as well as when it is moist.

The foregoing and other features of my invention will be understood from the accompanying drawings, and the following description and claims.

Figure 1:
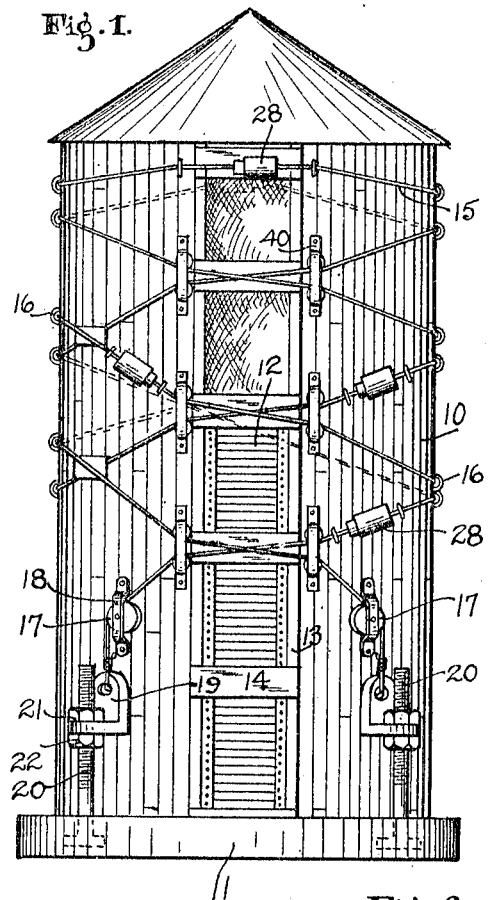
Figure 2:
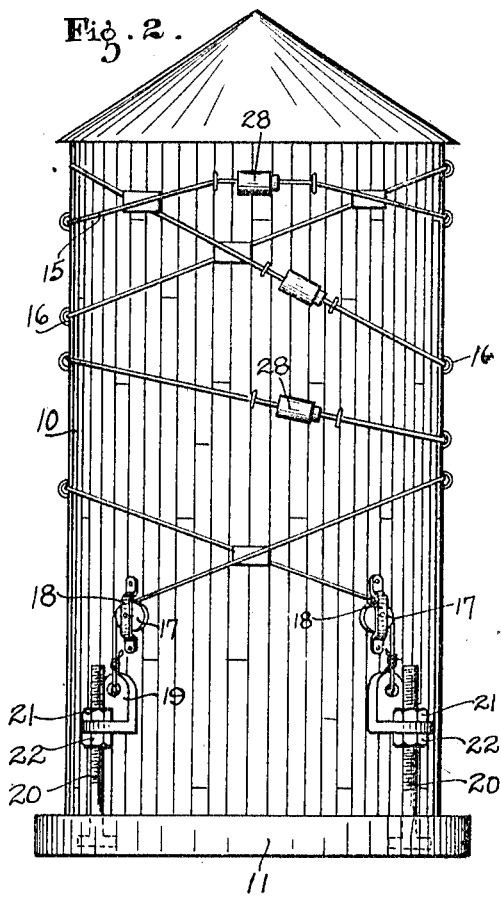
Figure 3:
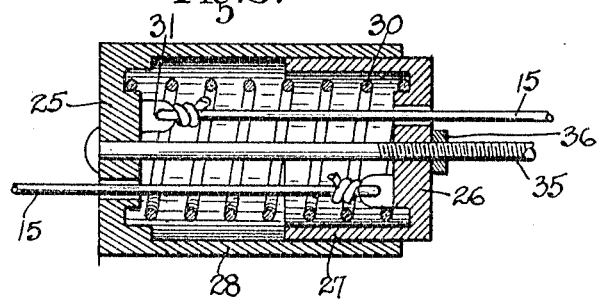
Figure 4:
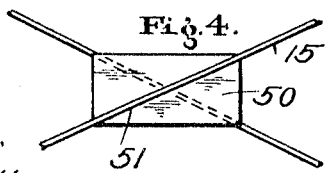

In the drawings Figure 1 is a front elevation of a silo arranged according to my invention, Fig. 2 is a rear elevation thereof. Fig. 3 is a longitudinal centrally located section through one of the springs. Fig. 4 is an elevation of one of the blocks for separating and guiding the cables at their crossings on the silo, parts of said cables being shown also.

The silo 10 is built of vertical staves upon the concrete foundation 11. There is a vertical series of doors 12 between the door casings 13 and cross bars 14. So far as my invention is concerned it is immaterial as to how the silo is built, excepting that it is intended to be for a silo built of staves.

The chief feature of the invention consists of using instead of hoops, cables 15 wrapped around the silo and drawn taut for holding the silo together. Therefore, I use two pairs of cables 15, each pair starting at opposite points near the top of the silo, and the cables of each pair extending in opposite directions and being wrapped around the silo and extending loosely through staples 16, and the lower ends pass over pulleys 17 in frames 18 secured to the silo and are connected with arms 19 which slip loosely over threaded rods 20 which have lower headed ends embedded in the cement foundation 11 and extend upwardly and have nuts 21 and 22 whereby the arms 19 may be tightened down, and cables clamped and drawn tightly around the silo. The four cables shown cross each other and the four tightening arms 19 are located at substantially equally distant points around the silo. There is shown here two arms 19 in front and two behind the silo.

From the foregoing it is seen that after the silo is constructed the binding cables 15 may be tightened or loosened by a person standing on the ground, without climbing on the silo, and that any number of cables may be used as desired, so as to effectually hold the staves in place.

The binding cables 15 are preferably equipped with springs to render the same yielding, so that cables will bind tightly around the silo, whether the silo expands or contracts. To that end there is shown herein a spring construction, see Fig. 3, which may be located any where in the cables 15, as desired. The form of spring shown, consists of two heads 25 and 26 with a tube 27 on the head 26 telescoping in the tube 28 on the head 25. A coiled spring 30 lies in the cylinder thus formed and presses the heads away from each other. One cable 15 is connected with an ear 31 on each head and the cables extend in opposite directions, each through the other head, so that if the cables are pulled tight they will tend to draw the two heads toward each other against the action of the spring. There is one of these spring constructions on each side of the silo near the top and a pair of cables extend from it in opposite directions and they are wrapped around the silo as heretofore explained. There may be a spring apparatus elsewhere in the cables as shown. This enables the cables to yield to accommodate themselves to the expansion or contraction of the silo.

In each spring construction I preferably place a bolt 35 through the two heads and with a nut 36, and in constructing the silo I first draw the two heads as close together as the spring will permit, by means of this bolt and nut, and after I have placed the cables in position and at the bottom have turned down the nuts 21 as tightly as I can, I then loosen the nut 36 and leave the spring in normal condition. This enables me to make the cables more tight and get more tension on the spring than if I did not use the bolt 35.

In order to hold the cables if some of the staves extend, and to guide them as they cross the door constructions I place a pair of brackets 40 beside the door construction and attach each to each cross bar 14 with an upper and lower sheave wheel 41 in each bracket and I pass the cable through this bracket in opposite directions, so that they will cross each other and be held in front of the bar 14. This not only guides the cables but keeps them from obstructing the doors for the discharge of ensilage.

The invention is not limited to any particular construction of springs, or means at the lower ends of the silo for drawing down and tightening the cables.

In order to separate and guide the cables 15 as they pass each other on the periphery of the silo I have provided blocks 50 which have oppositely inclined grooves 51 on the opposite sides thereof for receiving the said cables.

I claim as my invention:

1. A silo formed of staves, cables wound about the silo and extending from the top to the lower end thereof, means on the silo for holding the cables which permit them to be drawn, and means at the lower end of the silo for drawing down the lower ends of the cables for tightening the same.

2. A silo including a foundation, a superstructure formed of staves, cables wound around the silo and extending from top to the lower end thereof, means on the silo for holding the cables which permit of their longitudinal movement, and means secured to the foundation for drawing down the lower ends of the cables and tightening the cables around the silo.

3. A silo including a foundation, a superstructure formed of staves, cables wound around the silo and extending from the top to the lower end thereof, means on the silo for holding the cables which permit their longitudinal movement, means secured to the foundation for drawing down the lower ends of the cables and tightening the cables around the silo and pulleys secured to the silo over which the lower ends of the cables pass for tightening the same.

4. A silo including a foundation, a superstructure formed of staves, a pair of cables extending in opposite directions from a point near the upper end of the silo and coiled about the silo down to the lower end thereof, staples secured to the silo through which the cables loosely extend, and means connected with the foundation for drawing down and holding the lower ends of the cables.

5. A silo including a foundation, a superstructure of staves, cables wound around the silo and extending from the upper end to the lower end thereof, means on the silo for supporting said cables and permitting their longitudinal movement, springs in said cables to render them yielding, and means connected with the foundation for drawing down the lower ends of the cables and tightening the same.

6. A silo including a foundation, a superstructure of staves, cables coiled about the silo and extending from the upper end to the lower end thereof, means on the silo for supporting the cables and permitting their longitudinal movement, spring means connecting the cables, consisting of telescoping heads to which the cables are connected and through each of which one cable extends to the other head and a coiled spring between said cables, and means secured to the foundation for drawing said cables taut.

7. A silo including a foundation, a superstructure of staves, cables coiled about the silo and extending from the upper end to the lower end thereof, means on the silo for supporting the cables and permitting their longitudinal movement, and spring means connecting the cables consisting of telescoping heads to which the cables are connected, through each of which one cable extends to the other head and a coiled spring between said heads, and means secured to the foundation for drawing said cables taut, and means for temporarily compressing said spring.

8. A silo including a foundation, a superstructure of staves, provided with a vertical series of door openings, separating bars between the doors cables wound around the silo and extending from the upper end to the lower end thereof, brackets secured to the silo at each side of the series of door openings, pulleys in said brackets between which oppositely extending cables lie, and whereby the cables will cross in front of said separating bars and means connected with the foundation for drawing the lower ends of said cables taut.

9. A silo including a foundation, a superstructure formed of staves, cables extending in opposite directions from a point near the upper end of the silo and coiled about the silo down to the lower end thereof, and vertically threaded rods with their lower ends secured to the foundation and means connected with the lower ends of said cables adapted to be secured and tightened down on said rods whereby the cables may be drawn taut.

10. A silo including a foundation, a superstructure formed of staves, cables extending in opposite directions from a point near the upper end of the silo and coiled about the silo down to the lower end thereof, vertically threaded rods with their lower ends secured to the foundation an arm connected with the lower end of each cable and adapted to slip over one of said threaded rods, and means on said rods for tightening said arms thereon for drawing the cables taut.

11. A silo including a foundation, a superstructure formed of staves, cables extending in opposite directions from points near the upper end of the silo and coiled about the silo down to the lower end thereof, means secured to the silo at the crossing of the cables for supporting them, and means connected with the foundation for drawing down the lower ends of the cables.

12. A silo including a foundation, a superstructure formed of staves, cables extending in opposite directions from points near the upper end of the silo and coiled about the silo down to the lower end thereof, a block secured to the silo at each crossing of the cables and provided with grooves in its inner and upper surfaces for the respective cables to lie in, and means connected with the foundation for drawing down the lower ends of the cables.

In witness, whereof, I have hereunto affixed my signature in the presence of the witnesses herein named.

ELI N. CRAMER.

Witnesses:
J. H. WELLS,
O. M. McLAUGHLIN.